US012598447B2

(12) United States Patent　　　(10) Patent No.:　US 12,598,447 B2
Massarini et al.　　　　　　　　　(45) Date of Patent:　　　Apr. 7, 2026

(54) ABSTRACT MODEL GENERATION AS A DATA SERVICE FOR EDGE DEVICES

(71) Applicant: Red Hat, Inc., Raleigh, NC (US)

(72) Inventors: Maja Massarini, Tarcento (IT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 477 days.

(21) Appl. No.: 18/080,977

(22) Filed: Dec. 14, 2022

(65) Prior Publication Data

US 2024/0205649 A1　　Jun. 20, 2024

(51) Int. Cl.
*H04W 4/38*　　　　(2018.01)
*G06F 9/448*　　　　(2018.01)
*H04L 41/12*　　　　(2022.01)

(52) U.S. Cl.
CPC ............ *H04W 4/38* (2018.02); *G06F 9/4498* (2018.02); *H04L 41/12* (2013.01)

(58) Field of Classification Search
CPC ......... H04W 4/38; H04L 41/12; G06F 9/4498
See application file for complete search history.

(56) References Cited

U.S. PATENT DOCUMENTS

| | | | | |
|---|---|---|---|---|
| 11,770,391 | B1 * | 9/2023 | Bakthavatchalam .. | G06N 20/20 726/23 |
| 2016/0248629 | A1 * | 8/2016 | Erdmann ............. | H04L 41/0859 |
| 2017/0048280 | A1 * | 2/2017 | Logue ............... | H04L 41/0806 |
| 2017/0255452 | A1 * | 9/2017 | Barnes .................. | H04L 67/12 |
| 2019/0052683 | A1 * | 2/2019 | Logue ..................... | H04L 67/55 |
| 2019/0349261 | A1 * | 11/2019 | Smith ..................... | H04L 69/18 |
| 2020/0019404 | A1 * | 1/2020 | Billa ..................... | G06F 9/3802 |
| 2020/0020219 | A1 * | 1/2020 | Ashar .................. | G08B 21/00 |
| 2022/0038335 | A1 * | 2/2022 | Barton ................. | H04L 67/125 |
| 2022/0198254 | A1 * | 6/2022 | Dalli ..................... | G06N 3/084 |
| 2022/0299619 | A1 * | 9/2022 | Hu ............................ | G01S 7/415 |
| 2022/0321484 | A1 * | 10/2022 | Barton ................. | H04L 47/193 |
| 2024/0259277 | A1 * | 8/2024 | Chou ..................... | H04L 67/51 |

OTHER PUBLICATIONS

Home Assistant, "Detecting Method Used to Turn on Light", Help page, Feb. 2021, downloaded from https://community.home-assistant.io/t/detecting-method-used-to-turn-on-light/283272.

(Continued)

*Primary Examiner* — Blake J Rubin
(74) *Attorney, Agent, or Firm* — Womble Bond Dickinson (US) LLP

(57)　　　　　ABSTRACT

A system and method of providing additional context and decision-making capabilities in mesh network systems using IoT technology. The method includes receiving a request from a joiner node to join a mesh network of nodes, the joiner node to provide a service to objects. The method includes generating a set of non-deterministic finite-state machine (NFSM) models based on the service, each NFSM model configured to provide a unique version of the service by determining a state of the objects based on sensor data and object status data indicative of a user interaction with the objects. The method includes providing the set of NFSM models to the joiner node to cause the joiner node to select a single NFSM model of the set of NFSM models and use the single NFSM model to provide the unique version of the service to the objects.

18 Claims, 6 Drawing Sheets

(56)          References Cited

OTHER PUBLICATIONS

Home Assistant, "Events" manual, downloaded from https://www.home-assistant.io/docs/configuration/events/.

Home Assistant, "Home Assistant Context" manual, downloaded from https://data.home-assistant.io/docs/context/#:~:text=Context%20is%20used%20to%20tie,as%20result%20of%20the%20change.

Chang et al., "SmartProvenance: User-friendly provenance system for internet of things applications based on event flow graphs", Aug. 15, 2022, The Institution of Engineering and Technology.

* cited by examiner

Control Mesh Node 108

Processing Device 202b

Automation System Manager (ASM) Agent 109

Non-Deterministic Finite-State Machine Model Storage 110

Memory 204b

Network Interface 206b

Input/Output Device 205b

Device ID Component 207b

Mesh Node 104

Processing Device 202a

State Machine Management (SMM) Agent 105

Sensors 107

Memory 204a

Network Interface 206a

Input/Output Device 205a

Device ID Component 207a

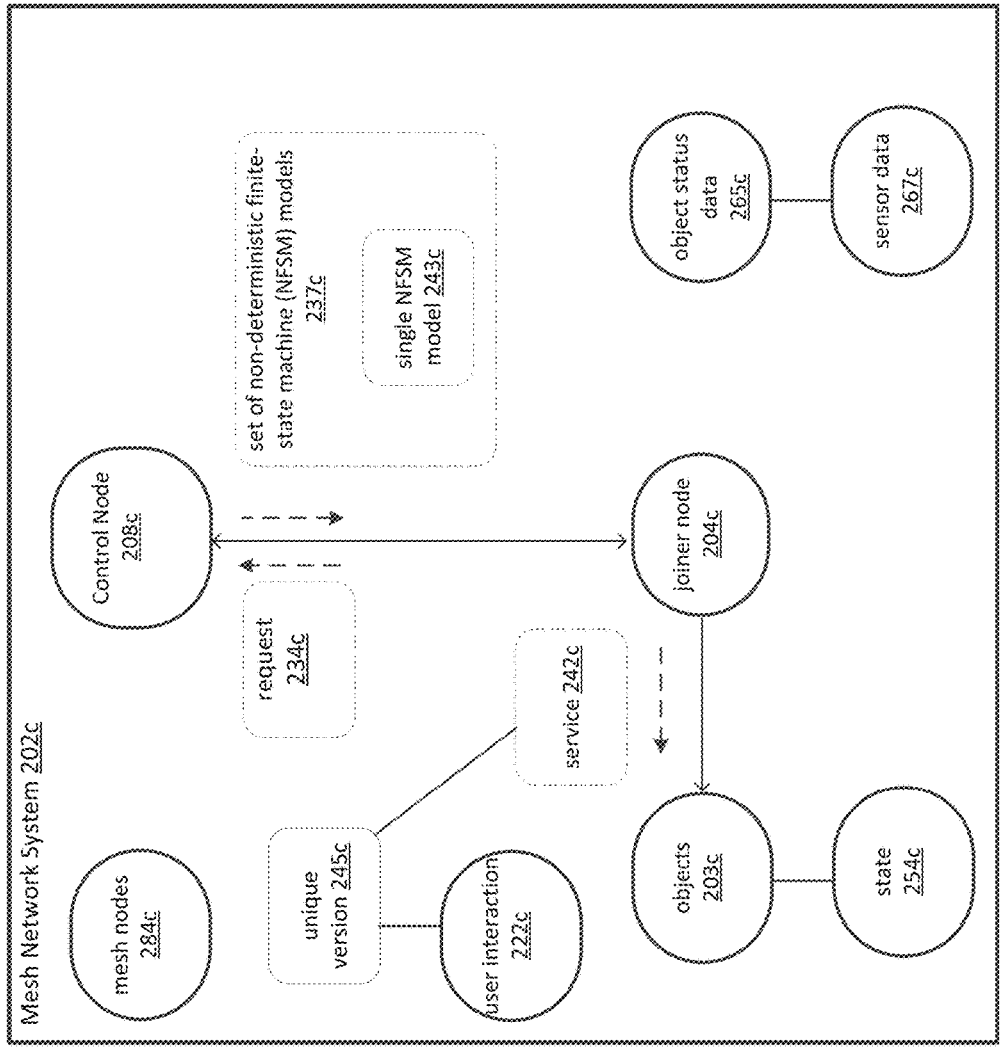
FIG. 2C

Figure 3:
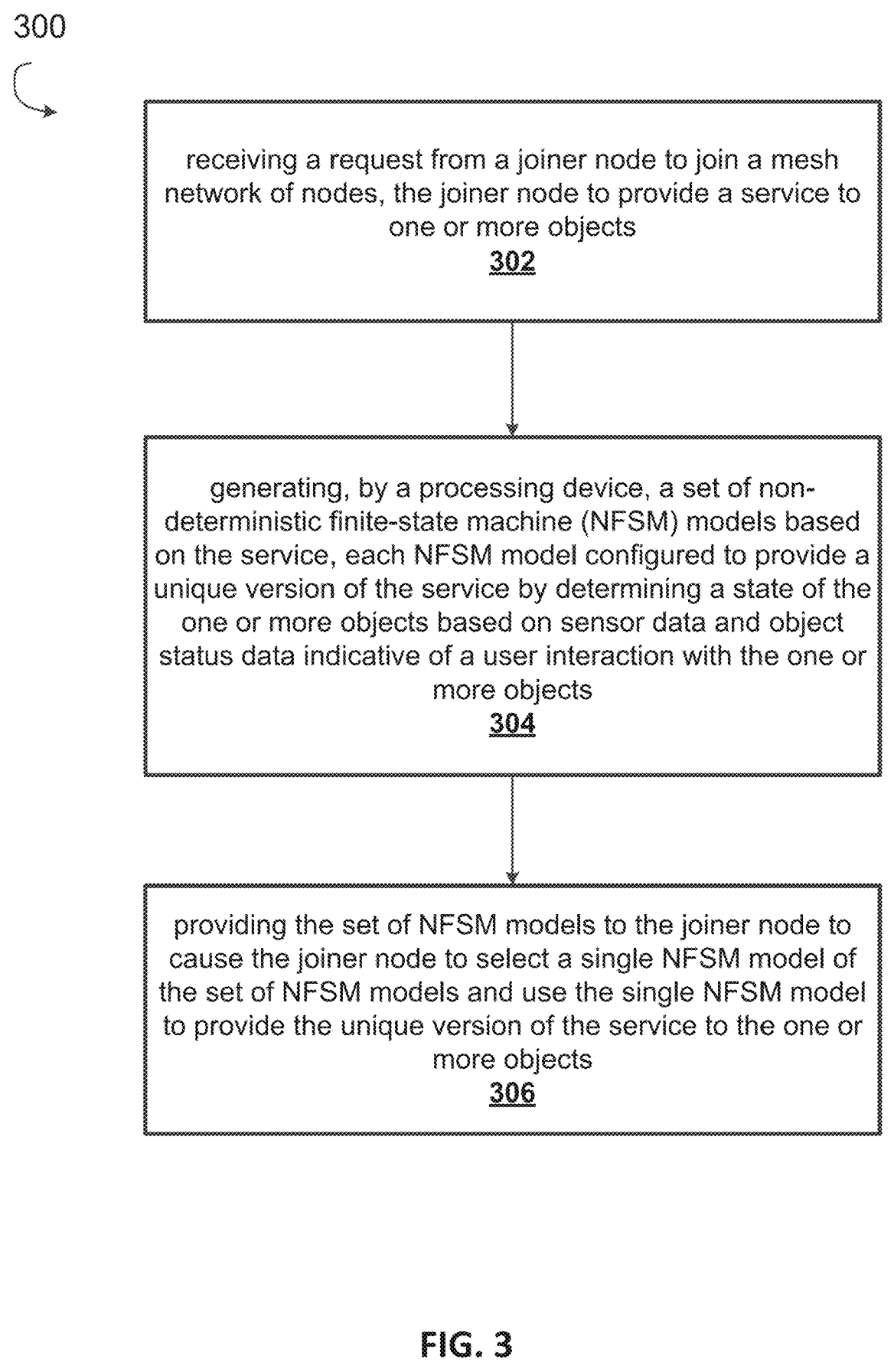

300 receiving a request from a joiner node to join a mesh
network of nodes, the joiner node to provide a service to
one or more objects
302 generating, by a processing device, a set of non-
deterministic finite-state machine (NFSM) models based
on the service, each NFSM model configured to provide a
unique version of the service by determining a state of the
one or more objects based on sensor data and object
status data indicative of a user interaction with the one or
more objects
304 providing the set of NFSM models to the joiner node to
cause the joiner node to select a single NFSM model of
the set of NFSM models and use the single NFSM model
to provide the unique version of the service to the one or
more objects
306

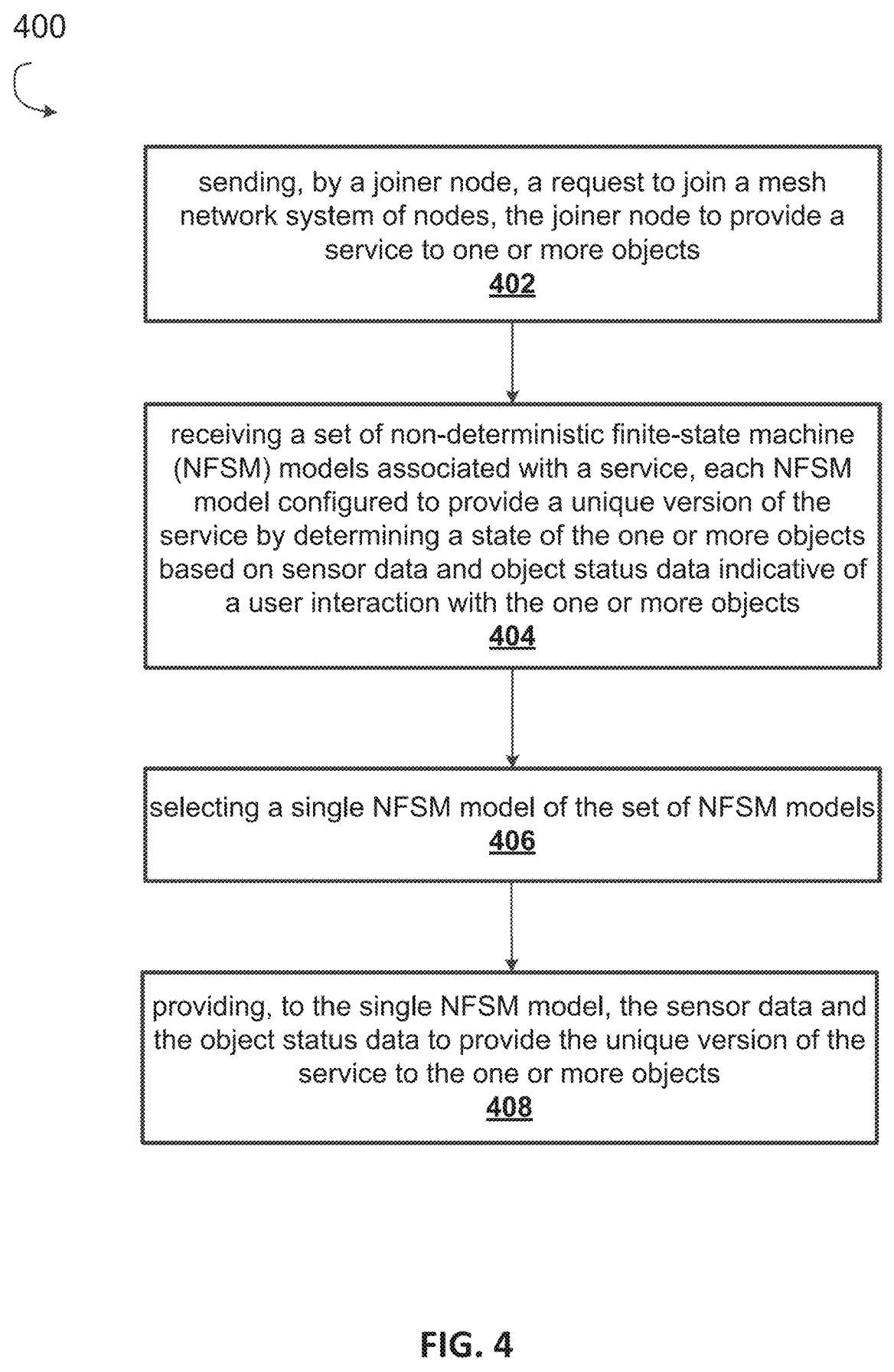

```
sending, by a joiner node, a request to join a mesh
network system of nodes, the joiner node to provide a
service to one or more objects
402
```

```
receiving a set of non-deterministic finite-state machine
(NFSM) models associated with a service, each NFSM
model configured to provide a unique version of the
service by determining a state of the one or more objects
based on sensor data and object status data indicative of
a user interaction with the one or more objects
404
```

```
selecting a single NFSM model of the set of NFSM models
406
```

```
providing, to the single NFSM model, the sensor data and
the object status data to provide the unique version of the
service to the one or more objects
408
```

FIG. 4

ABSTRACT MODEL GENERATION AS A DATA SERVICE FOR EDGE DEVICES

TECHNICAL FIELD

The present disclosure relates generally to software technology, and more particularly, to systems and methods of providing additional context and decision-making capabilities in mesh network systems using internet of things (IoT) technology.

BACKGROUND

The Internet of things (IoT) describes physical objects (or groups of such objects) with sensors, processing ability, software and other technologies that connect and exchange data with other devices and systems over the Internet or other communications networks. A mesh network is a network in which the IoT devices—or nodes—are linked together, branching off other devices or nodes. These networks are set up to efficiently route data between devices and clients. They help individuals and organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2C is a block diagram depicting an example environment of a mesh network system, according to some embodiments;

FIG. 3 is a flow diagram depicting a method of providing additional context and decision-making capabilities in mesh network systems using IoT technology, according to some embodiments; and FIG. 4 is a flow diagram depicting a method of providing additional context and decision-making capabilities in mesh network systems using IoT technology, according to some embodiments.

DETAILED DESCRIPTION

Figure 1:
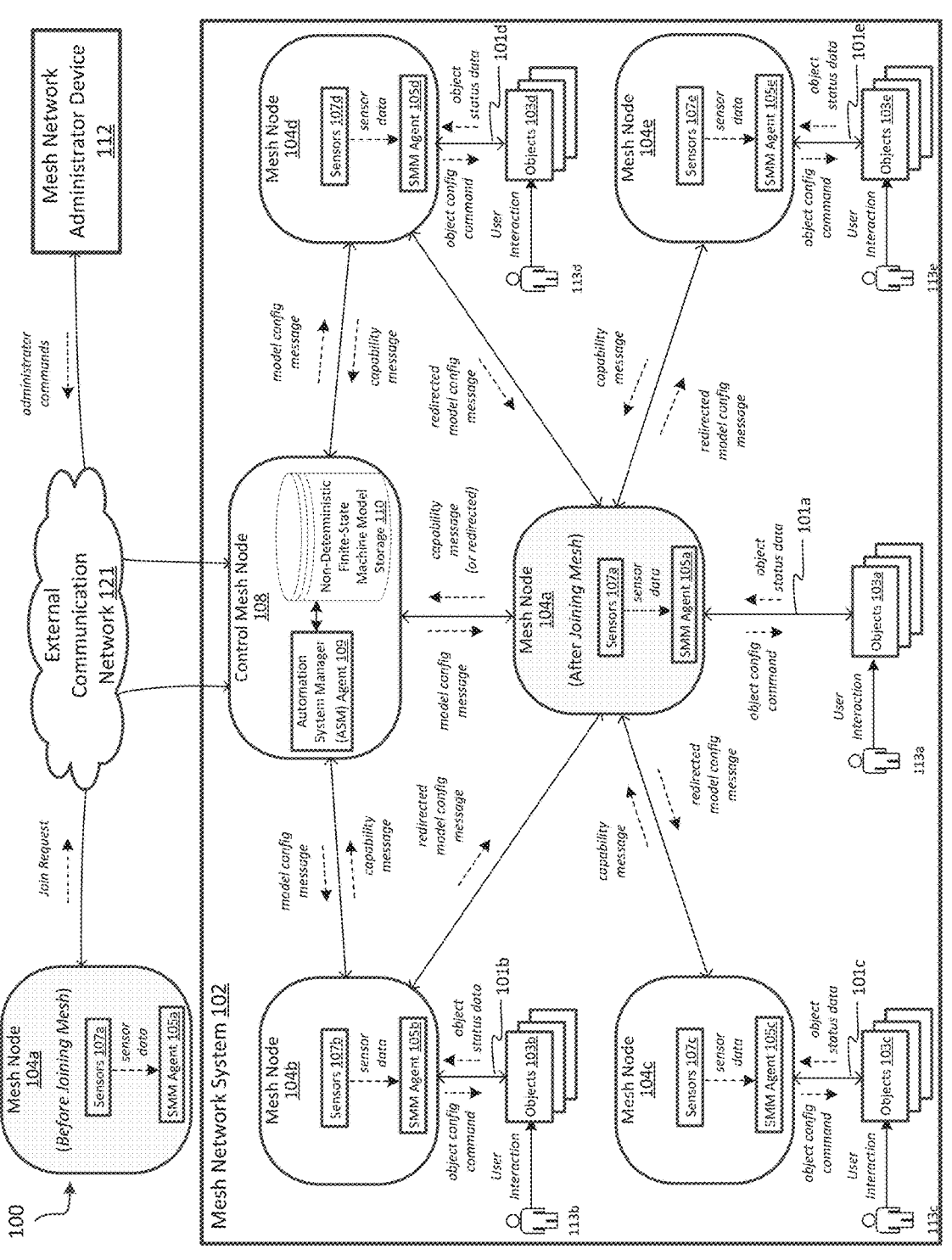
FIG. 1 is a block diagram depicting an example environment for providing additional context and decision-making capabilities in mesh network systems using IoT technology, according to some embodiments.

IoT devices are used for various purposes including, for example, edge computing and automation scenarios (e.g., home, business, automotive). When a user follows the state of an automated device the user could get confused by changes that are made by the system, which uses rules that are mostly unknown to the user. The more rules there are in the system, then the more difficult it is for the user to understand what is happening. While a user can see the final state of a device, for example, when the system turns on a light, the user cannot determine why the system entered into this state where the light is turned on. The user may wonder whether some other event forced the system into this state, or if the system decided on its own to enter this state and to turn on the light. That is, the conventional automation system does not inform a user about the internal state of a device and why the device entered this internal state. Furthermore, in an automated system where both the users and the system are supposed to cooperate with one another, then an unresolvable conflict between the two is inevitable. This is a key challenge in edge deployments and automation scenarios where the user's actions and the environmental actions could cause a conflict, where the conflicts cause distractions and significant safety concerns. For example, the inability for a user to understand an internal state of the device and/or the conflicts that could arise may result in, for example, automobile accidents or a failure to promptly notify users during a building fires. Thus, there is a long felt need to solve the problem related to providing additional context and decision-making capabilities in systems using IoT technology to mitigate or prevent unsafe scenarios.

Aspects of the present disclosure address the above-noted and other deficiencies by providing additional context and decision-making capabilities in mesh network systems using IoT technology. As discussed in greater detail below, when a device joins a mesh network (e.g., an IoT network), a control mesh node (sometimes referred to as, control node) of the mesh network generates a nondeterministic state machine model for the device based on pre-built rules within the control mesh node that represent real-end states (e.g., ON/OFF) for the device. The non-deterministic nature of this allows for other rule types to be defined dynamically, to give more context to how the state was reached. This could include, as non-limiting examples, how the event occurred, whether it was triggered by an alarm, whether it was forced on/off by a user, and whether it was triggered by an environmental condition (e.g., temperature, pressure, moisture, etc.). By abstracting the model in this case, the embodiments of the present disclosure can take a device-agnostic view of the world. This allows the control mesh node to create generic profiles that can be used to debug in a clearer manner events of interest. It also allows the control mesh node to selectively associate devices with particular abstract models to create an interchangeable abstract representation of the model.

The control mesh node stores (e.g., in memory or a database) the model and makes it available to end users, so when a new device joins the mesh network, the control mesh node can present a plurality of models to allow the device (and/or the network's security profiles) to complimentary select a model that best suits the device or the objects it manages. This can also allow for mobility related advancements of the model, such as allowing the model to change based on the environment that the device is deployed into or that it has migrated to. For example, this would a allow a model for a car while parked or when the car is in motion or when the car is at a certain location.

Benefits of the embodiments of the present disclosure include the ability to update the states of the device in real-time with new semantics, and ability to provide an explanation to the user as to why the device moved to a particular state. This provides a data service capability enriching the decision-making process by giving more context beyond the basic state the device is in, while simultaneously enriching the debugging capabilities. This in turn allows the system to provide more artificial intelligence (AI) and machine learning (ML) style techniques to optimize usage.

In an illustrative embodiment, a control node of a mesh network system of mesh nodes receives a request from a mesh node (sometimes referred to as, "joiner node") to join the mesh network system. The joiner node is configured to provide a service (e.g., home automation account, security service, etc.) to one or more objects (e.g., lights, cameras, curtains, etc.) that are communicatively coupled to the joiner node. The control node is configured to generate a set of non-deterministic finite-state machine (NFSM) models based on the service. Each NFSM model is configured to provide a unique version of the service by determining a state (e.g., enabled/disabled, open/closed, etc.) of the one or more objects based on sensor data (e.g., light data, acoustic data, etc.) and object status data indicative of a user interaction with the one or more objects. The control node is configured to provide the set of NFSM models to the joiner node to cause the joiner node to select a single NFSM model of the set of NFSM models and use the single NFSM model to provide the unique version of the service to the one or more objects.

FIG. 1 is a block diagram depicting an example environment for providing additional context and decision-making capabilities in mesh network systems using IoT technology, according to some embodiments. The environment 100 includes a mesh network system 102 (sometimes referred to as, "mesh network" or "IoT network") a mesh network system 102, and a mesh network administrator device 112. The mesh network system 102 includes mesh nodes 104 (e.g., mesh nodes 104a, 104b, 104c, 104d, 104e) that are each communicatively coupled together via one or more communication networks (e.g., Bluetooth, Wi-Fi, cellular, etc.) of the mesh network system 102.

The mesh network administrator device 112 sets-up and controls the mesh network system 102 by sending commands (shown in FIG. 1 as, administrator commands) to the mesh nodes 104.

As shown in FIG. 1, mesh node 104a (sometimes referred to as, "joiner node 104a") resides outside of the mesh network system 102 prior to joining the mesh network system 102 but resides inside the mesh network system 102 after joining the mesh network system 102. Upon joining the mesh network system 102, the joiner node 104a can communicate with the other mesh node 104s of the mesh network system 102.

The mesh network system 102 includes a control mesh node 108 (sometimes referred to as, "control node"), which is a mesh node 104 that is further configured with additional administrative functionality for controlling and/or managing the other mesh nodes 104 in the mesh network system 102. The control mesh node 108 is communicably coupled to one or more computing devices (e.g., mesh network administrator device 112) that are outside and not a member of the mesh network system 102 via an external communication network 121. In some embodiments, the external communication network 121 may be any of the communication networks of the mesh network system 102. As discussed herein, the control mesh node 108 is configured to determine whether a mesh node 104 is permitted to join, or stay joined to, the one or more subnetworks of the mesh network system 102 based on the permissions associated with the mesh node 104a, and then add (or remove) the mesh node 104 to the mesh network system 102.

The control mesh node 108 includes a non-deterministic finite-state machine (NFSM) model storage 110 for storing a plurality of NFSM models for the mesh nodes 104 of the mesh network system 102. A finite-state machine (FSM) model is a mathematical model of computation. It is an abstract machine that can be in exactly one of a finite number of states at any given time. An FSM model is called a deterministic finite automaton (DFA) model if each of its transitions is uniquely determined by its source state and input symbol and reading an input symbol is required for each state transition. Conversely, a NFSM model does have to obey these restrictions.

The control mesh node 108 executes a state machine management (SMM) agent 105b that is configured to generate a unique set of NFSM models for each mesh node 104 of the mesh network system 102 based on a capability message that the control mesh node 108 receives from each mesh node 104, and send a model configuration message (shown in FIG. 1 as, "model config message") to the mesh node 104 that includes the unique set of NFSM models. For example, the control mesh node 108 receives a first capability message from the mesh node 104a, a second capability message from mesh node 104b, a third capability message from mesh node 104c, a fourth capability message from mesh node 104d, and a fifth capability message from mesh node 104e.

A capability message includes the sensor data generated by the sensor 107 of the mesh node 104. The capability message also indicates the hardware (e.g., available memory, available processing, available storage, etc.) capabilities and availabilities, software capabilities and availabilities (e.g., operating system, available services, etc.) of the mesh node 104. The capability message also includes object status data that indicates a real-time status (e.g., configuration, position, initialization) of the objects 103 that are coupled to the mesh node 104. The capability message also indicates the one or more services that the mesh node 104 is to provide to the objects 103. The capability message also includes a device type associated with the mesh node 104 and a device type associated with each of the objects 103. For example, the device type of the mesh node 104 may indicate that the mesh node is a personal computer (e.g., Raspberry Pi, laptop, desktop, etc.) and the device types of the objects may indicate that the objects are light fixtures.

The control mesh node 108 stores the NFSM models in the NFSM model storage 110. The control mesh node 108 may retrieve the NFSM models from the NFSM model storage 110 to be distributed to a mesh node 104 that is either requesting to join the mesh network system or requesting an update to its locally stored (e.g., in memory or cache) set of NFSM models.

Each mesh node 104 is communicatively coupled to one or more objects 103 via a protocol bus 101. Specifically, the mesh node 104a is communicatively coupled to one or more objects 103a via protocol bus 101a, the mesh node 104b is communicatively coupled to one or more objects 103b via protocol bus 101b, the mesh node 104c is communicatively coupled to one or more objects 103c via protocol bus 101c, the mesh node 104d is communicatively coupled to one or more objects 103d via protocol bus 101d, and the mesh node 104e is communicatively coupled to one or more objects 103e via protocol bus 101e. The protocol bus 101 may support any type of communication protocol between the mesh node 104 and its respective objects 103, such as a smart business/home protocol (e.g., Z-Wave, Zigbee, Insteon, Bluetooth, Thread), Ethernet, Wi-Fi, cellular, or the like.

A user 113 may interact with the one or more objects 103. Specifically, the user 113a may interact with the one or more objects 103a, the user 113b may interact with the one or more objects 103b, the user 113c may interact with the one or more objects 103c, the user 113d may interact with the one or more objects 103d, and the user 113e may interact with the one or more objects 103e. A user 113 may interact with the one or more objects 103 to cause the one or more objects to enter a state or be in a particular configuration. For example, a first object 103a may be a light that is coupled to a first switch and a second object 103b may be a fan that is coupled to a second switch. The user may toggle the first switch to turn on the light and toggle the second switch to turn on the fan. As another example, a first object 103a may be a curtain and a second object 103b may be blinds. The user may move the curtain to allow light to enter through a window and close the blinds to block the light from coming through the window.

Each mesh node 104 includes a plurality of sensors 107 that are each configured to detect and measure events or changes in its surrounding environment, generate data (shown in FIG. 1 as, sensor data) that is indicative of these measurements, and send the configuration data to a state machine management (SMM) agent 105 that executes on the mesh node 104. Specifically, the mesh node 104a includes sensors 107a, the mesh node 104b includes sensors 107b, the mesh node 104c includes sensors 107c, the mesh node 104d includes sensors 107d, and the mesh node 104e includes sensors 107e. A sensor may be, for example, a position sensor, a proximity sensor, a pressure sensor, a temperature sensor, a magnetic field sensor, a heart rate sensor, a light sensor, a gyroscope (e.g., to measure orientation and angular velocity of the object), an accelerometer, a force sensor, a vibration sensor, a fluid property sensor, a pressure sensor, a humidity sensor, a photo optic sensor, a photoelectric sensor, a network traffic sensor, or the like.

Each mesh node 104 executes a state machine management (SMM) 105 agent that is configured to provide one or more services to the objects 103 of the mesh node 104 by using one or more NFSM models. Specifically, the mesh node 104a executes SMM agent 105a, the mesh node 104b executes SMM agent 105b, the mesh node 104c executes SMM agent 105c, the mesh node 104d executes SMM agent 105d, and the mesh node 104e executes SMM agent 105e.

The SMM agent 105 may be configured to provide one or more services of any type. For example, the SMM agent 105a may be configured to provide an automated appliance control service for any of the objects 103a, which may be an oven, a refrigerator, a range, a washing machine, a heating venting air conditioning (HVAC) system, or the like. The SMM agent 105a may be configured to provide an automated lighting and fan service for any of the objects 103a, which may be a light, a fan, a light/fan timer, a light/fan sensor, or the like. The SMM agent 105b may be configured to provide an automated door and gate access service for any of the objects 103b, which may be a driveway gate, a pedestrian gate, a garage door, an interior or exterior door of a building, an automobile door, an automobile door/hood/trunk, or the like. The SMM agent 105c may be configured to provide an automated blind and curtain service for any of the objects 103c, which may be blinds, curtains, shades, or the like. The SMM agent 105d may be configured to provide a home or business security service for any of the objects 103d, which may be camera, a video camera, a microphone, an alarm, or the like. The SMM agent 105e may be configured to provide an entertainment service for any of the objects 103e, which may be a radio, a stereo, a speaker, a television, a computer, or the like. The SSM agent 105e may be configured to provide an automation service for any of the objects 103e, which may be critical electronics (e.g., breaking controls, steering controls, acceleration controls, exterior lighting) for an automobile and/or interior electronics (e.g., interior lighting, radio, interior HVAC, door/hood/trunk ajar lighting) for the automobile, or the like.

The SMM agent 105 may be configured to determine an object status of the one or more objects 103c coupled to the mesh node 104 of the SMM agent 105. The SMM agent 105 may use audio/video equipment (e.g., camera, microphone) associated with the mesh node 104c to detect a state (e.g., position, status, configuration) of the one or more objects 103. For example, the SMM agent 105c may be configured to provide an automated blind and curtain service for any of its objects 103c, which are curtains. The SMM agent 105c may use a video camera to determine that the curtain is either open or closed, and generate data (shown in FIG. 1 as, object status data) to indicate the current position of the curtain.

The SMM agent 105 may query the objects 103c via the protocol bus 101 to determine a position and configuration of the one or more objects 103. For example, the SMM agent 105a may be configured to provide an automated lighting service for any of the objects 103a, which may each be a light. The SMM agent 105 may query the objects 103c via the protocol bus 101 to determine that the light corresponding to a first object 103c is enabled, the light corresponding to a second object 103c is disabled, and the light corresponding to a third object 103c is burnt out. The SMM agent 105 generates object status data to indicate the current status of each of the lights.

The SMM agent 105 may include in the object status data an indication that a user 113 interacted with the one or more objects 103. For example, if the SMM agent 105a determined that an object (e.g., curtain, value, blind) was in an open or closed position, then the SMM agent 105a may determine that the object 103 is in that position because the user 113a forced the object 103 into that position. In some embodiments, the SMM agent 105 may determine that an object 103 (e.g., switch, button, lever, curtain) is in an enabled state or opened position, and in response, the SMM agent 105 may determine that the user 113 forced the object 103 to be the enabled state or opened position.

The SMM agent 105 may be configured to determine the one or more services to provide to the objects 103 based on the sensor data and/or the object status data associated with the objects 103b. To provide the service to its object 103, the SMM agent 105 selects, based on the sensor data and/or the object status data associated with the objects 103b, an NFSM model from the set of NFSM models (which are provided by the control mesh node 108) that best meets the service demands of the control mesh node 108. For example, if the sensor data indicates that it is nighttime, then the SMM agent 105 may select a first NFSM model that is configured for optimal performance in the dark. But if the sensor data indicates that it is daytime, then the SMM agent 105 may select a second NFSM model that is configured for optimal performance in daylight.

The SMM agent 105 executes the NFSM model and provides the sensor data, from its sensors 107, and/or the object status data associated with its objects 103c to the NFSM model to cause the NFSM model to generate one or more object configuration commands. The object configuration commands may instruct an object 103 to perform one or more actions or enter one or more modes/states including, for example, open/close a door/gate, enable/disable a switch (e.g., light switch, fan switch, etc.), enable/disable a mode button, open/close a curtain or blinds, or the like. The SMM agent 105 sends the one or more object configuration commands to the objects 103c to cause the one or more objects 103c perform one or more actions or enter one or more modes/states including control the objects 103c. For example, the object configuration commands may toggle a switch, trigger a button, move an object, etc.

Each mesh node (e.g., mesh node 104a, control mesh node 108, etc.) of the mesh network system 102 may be positioned (e.g., arranged, organized) within the mesh network system 102, such that the mesh node 104 is within a minimum physical distance (e.g., up to 10 meters with a Bluetooth connection, up to 46 meters with a wireless local area network (WLAN) connection) of neighboring mesh nodes to be able to communicate with its neighboring nodes by using one or more types of communication capabilities.

As shown in FIG. 1, the mesh node 104a has neighboring mesh nodes that include control mesh node 108 and mesh nodes 104b, 104c, 104d, 104e. The mesh node 104b has neighboring mesh nodes that include mesh nodes 104a and control mesh node 108. The mesh node 104c has a neighboring mesh node that includes mesh node 104a. The mesh node 104d has neighboring mesh nodes that include mesh nodes 104a and control mesh node 108. The mesh node 104e has neighboring mesh node that include mesh node 104a.

A mesh node 104 may indirectly communicate with a non-neighboring node by directly communicating through a neighboring mesh node. For example, if the control mesh node 108 wants to communicate with the mesh node 104c, then the control mesh node 108 may send a first message (e.g., model config message) to mesh node 104a to cause the mesh node 104a to send a second message (e.g., redirected model config message) to the mesh node 104c, where the second message indicates the details of the first message. As another example, the control mesh node 108 may send a first message (e.g., model config message) to the mesh node 104b to cause the mesh node 104b to send a second message (e.g., redirected model config message) to the mesh node 104a to cause the mesh node 104 to send a third message (e.g., redirected model config message) to the mesh node 104e, where the third message indicates the details of the first message and the second message. As another example, the mesh node 104c may send a capability message to the mesh node 104a to cause the mesh node 104a to send the capability message (shown in FIG. 1 as, "redirected capability message") to the control mesh node 108.

A mesh node 104 may be configured to discover its neighboring mesh nodes by broadcasting a ping message outward and identifying the mesh nodes that responds to the ping message as its neighboring mesh nodes. For example, the mesh node 104a may transmit ping messages toward the mesh nodes 104b, 104c, 104d, 104e and control mesh node 108 to cause each of the nodes to either respond with an acknowledgement (e.g., an ACK) or not respond (e.g., stay silent). A mesh node 104 may send a message to the control mesh node 108 to indicate its discovery of its neighboring nodes.

A communication network (e.g., external communication network 121, any of the communication networks of the mesh network system 102) may be a public network (e.g., the internet), a private network (e.g., a local area network (LAN) or wide area network (WAN)), or a combination thereof. In some embodiments, a communication network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g., cell towers), etc. The external network may carry communications (e.g., data, message, packets, frames, etc.) between any other computing device.

A mesh node 104, the control mesh node 108, and a mesh network administrator device 112 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

In some embodiments, the mesh node 104, the control mesh node 108, and the mesh network administrator device 112 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the control mesh node 108 of the mesh network system 102 receives a join request from the mesh node 104a (sometimes referred to as, "joiner node") to join the mesh network system 102. The mesh node 104a is configured to provide a service (e.g., home automation account, security service, etc.) to one or more objects 103a (e.g., lights, cameras, curtains, etc.) that are communicatively coupled to the mesh node 104a. The control mesh node 108 is configured to generate a set of non-deterministic finite-state machine (NFSM) models based on the service. Each NFSM model is configured to provide a unique version of the service by determining a state (e.g., enabled/disabled, open/closed, etc.) of the one or more objects 103 based on sensor data (e.g., light data, acoustic data, etc.) received from sensors 107a and object status data that is indicative of a user interaction (from user 109a) with the one or more objects 103a. The control mesh node 108 is configured to provide the set of NFSM models to the mesh node 104a to cause the mesh node 104a to select a single NFSM model of the set of NFSM models and use the single NFSM model to provide the unique version of the service to the one or more objects 103.

Although FIG. 1 shows only a select number of computing devices (e.g., mesh nodes 104, control mesh node 108, and mesh network administrator device 112), the environment 100 may include any number of computing devices that are interconnected in any arrangement to facilitate the exchange of data between the computing devices.

Figures 2A, 2B:
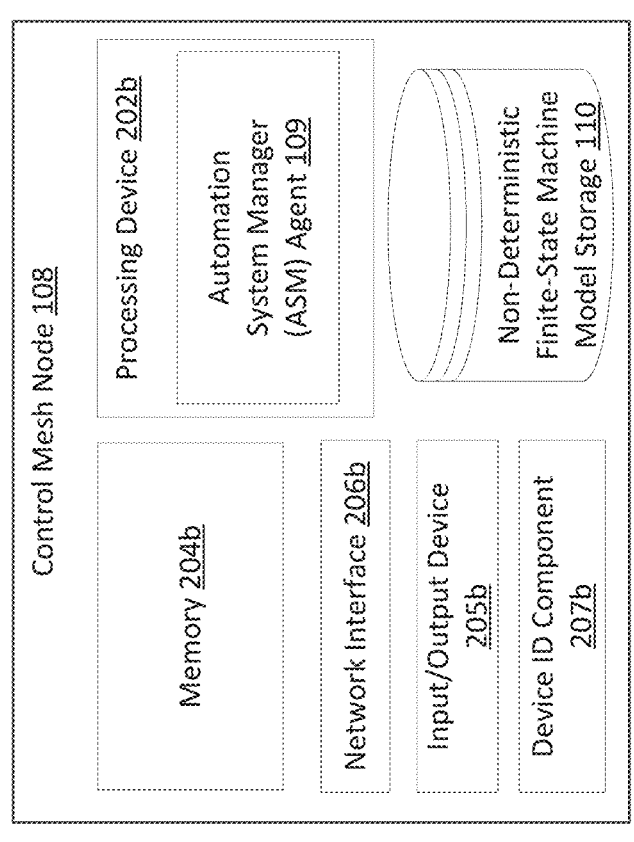
FIG. 2A is a block diagram depicting an example mesh node 104 of the mesh network system 102 in FIG. 1, according to some embodiments.
FIG. 2B is a block diagram depicting an example of the control mesh node 108 of the environment in FIG. 1, according to some embodiments.

FIG. 2A is a block diagram depicting an example mesh node 104 of the mesh network system 102 in FIG. 1, according to some embodiments. While various devices, interfaces, and logic with particular functionality are shown, it should be understood that the one or more mesh nodes 104 (e.g., mesh nodes 104a-e) of the mesh network system 102 each include any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The mesh node 104 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the mesh node 104. In some embodiments, the processing device 202a and the memory 204a form various processing devices and/or circuits described with respect to the mesh node 104. The instructions include code from any suitable computer programming language such as, but not limited to, C, C++, C#, Java, JavaScript, VBScript, Perl, HTML, XML, Python, TCL, and Basic.

The processing device 202a may execute a state machine management (SMM) agent 105 that is configured to send a request to the control mesh node 108 to join the mesh network system 102. The SMM agent 105 may be configured to provide a service to one or more objects 103.

The SMM agent 105 may be configured to receive a set of NFSM models, where each NFSM model is configured to provide a unique version of the service by determining a state of the one or more objects 103 based on sensor data and object status data indicative of a user interaction with the one or more objects 103.

The SMM agent 105 may be configured to select a single NFSM model of the set of NFSM models and use the single NFSM model to provide the unique version of the service to the one or more objects 103. The SMM agent 105 may be configured to use the single NFSM to determine the state of the one or more objects 103 by determining, based on the object status data, that a user 113 forced the one or more objects 103 into the state.

The SMM agent 105 may be configured to use the single NFSM to determine the state of the one or more objects 103 by identifying a second state for the one or more objects 103 based on the sensor data and allow the one or more objects 103 to be in the state responsive to identifying the second state for the one or more objects 103.

The SMM agent 105 may be configured to determine the state of the one or more objects 103 by determining that the one or more objects 103 are configured in an intermediate state, identify the state of the one or more objects 103 based on the sensor data, reconfigure the one or more objects 103 from the intermediate state into the state.

In some embodiments, the user 113 caused the one or more objects 103 to enter the state by at least one of moving the one or more objects 103, toggling a switch associated with the one or more objects 103, or pushing a button associated with the one or more objects 103.

The SMM agent 105 may be configured to gather the sensor data from one or more sensors 107 coupled to the mesh node 104, where the sensor data is indicative of an environment associated with the mesh node 104.

The SMM agent 105 may be configured to determine the state of the one or more objects 103 by determining that the single NFSM model generates an undesired (e.g., non-optimal for the object 103) output based on at least one of the sensor data or the object status data, and in response, select a second NFSM model of the set of NFSM models and use the second NFSM model to provide a second unique version of the service to the one or more objects 103.

The SMM agent 105 may be configured to determine the state of the one or more objects 103 by generating a description associated with the one or more objects 103, and presenting (e.g., on a screen) the description to the user 113. In some embodiments, the description includes at least one or more of an indication that the user forced the one or more objects 103 into the state, an indication that one or more alarms caused one or more objects 103 to enter the state, or an indication that one or more sensors caused the one or more objects 103 to enter the state.

The SMM agent 105 may be configured to determine the state of the one or more objects 103 by determining a conflict between a first state selected by the user and a second state selected by the single NFSM model, selecting, based on the service, the second state selected by the single NFSM model instead of the first state selected by the user 113; and configuring (e.g., via an object configuration command) the one or more objects 103 into the second state.

The mesh node 104 includes a one or more sensors 107 that are each configured to detect and measure events or changes in its surrounding environment, generate data (shown in FIG. 1 as, sensor data) that is indicative of these measurements, and send the configuration data to its respective SMM agent 105.

The mesh node 104 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the mesh node 104 includes a plurality of network interfaces 206a of different types, allowing for connections to a variety of networks, such as local area networks (public or private) or wide area networks including the Internet, via different sub-networks.

The mesh node 104 includes an input/output device 205a configured to receive user input from and provide information to a user. In this regard, the input/output device 205a is structured to exchange data, communications, instructions, etc. with an input/output component of the mesh node 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 205*a* and the components of the mesh node 104. In some embodiments, the input/output device 205*a* includes machine-readable media for facilitating the exchange of information between the input/output device 205*a* and the components of the mesh node 104. In still another embodiment, the input/output device 205*a* includes any combination of hardware components (e.g., a touchscreen), communication circuitry, and machine-readable media.

The mesh node 104 includes a device identification component 207*a* (shown in FIG. 2A as device ID component 207*a*) configured to generate and/or manage a device identifier (sometimes referred to as, "mesh node ID") associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., public encrypted message, private encrypted message, etc.) that the mesh node 104 sends to a computing device.

The mesh node 104 includes a bus (not shown), such as an address/data bus or other communication mechanism for communicating information, which interconnects the devices and/or components of mesh node 104, such as processing device 202*a*, network interface 206*a*, input/output device 205*a*, and/or device ID component 207*a*.

In some embodiments, some or all the devices and/or components of mesh node 104 may be implemented with the processing device 202*a*. For example, the mesh node 104 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the control mesh node 108 of the environment in FIG. 1, according to some embodiments. While various devices, interfaces, and logic with particular functionality are shown, it should be understood that the control mesh node 108 includes any number of devices and/or components, interfaces, and logic for facilitating the functions described herein. For example, the activities of multiple devices may be combined as a single device and implemented on a same processing device (e.g., processing device 202*b*), as additional devices and/or components with additional functionality are included.

The control mesh node 108 includes a processing device 202*b* (e.g., general purpose processor, a PLD, etc.), which may be composed of one or more processors, and a memory

204*b* (e.g., synchronous dynamic random-access memory (DRAM), read-only memory (ROM)), which may communicate with each other via a bus (not shown). The processing device 202*b* includes identical or nearly identical functionality as processing device 202*a* in FIG. 2A, but with respect to devices and/or components of the control mesh node 108 instead of devices and/or components of the mesh node 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the control mesh node 108 instead of devices and/or components of the mesh node 104.

The processing device 202*b* may execute an automation system manager (ASM) agent 109 that is configured to receive a request from a mesh node 104 to join the mesh network system 102. The ASM agent 109 may be configured to generate a set of non-deterministic finite-state machine (NFSM) models based on a service that is to be provided by the mesh node 104 to one or more objects 103 that are coupled to the mesh node 104. The ASM agent 109 configures each NFSM model such that they provide a unique version of the service by determining a state of the one or more objects 103 based on sensor data and object status data indicative of a user interaction with the one or more objects 103. The ASM agent 109 may be configured to provide the set of NFSM models to the mesh node 104 to cause the mesh node 104 to select a single NFSM model of the set of NFSM models and use the single NFSM model to provide the unique version of the service to the one or more objects 103.

The control mesh node 108 includes a non-deterministic finite-state machine (NFSM) model storage 110 for storing a plurality of NFSM models for the mesh nodes 104 of the mesh network system 102. A finite-state machine (FSM) model is a mathematical model of computation. It is an abstract machine that can be in exactly one of a finite number of states at any given time. An FSM model is called a deterministic finite automaton (DFA) model if each of its transitions is uniquely determined by its source state and input symbol and reading an input symbol is required for each state transition. Conversely, a NFSM model does have to obey these restrictions.

The control mesh node 108 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the control mesh node 108 instead of devices and/or components of the mesh node 104.

The control mesh node 108 includes an input/output device 205*b* configured to receive user input from and provide information to a user. In this regard, the input/output device 205*b* is structured to exchange data, communications, instructions, etc. with an input/output component of the control mesh node 108. The input/output device 205*b* includes identical or nearly identical functionality as input/output device 205*a* in FIG. 2A, but with respect to devices and/or components of the control mesh node 108 instead of devices and/or components of the mesh node 104.

The control mesh node 108 includes a device identification component 207*b* (shown in FIG. 2B as device ID component 207*b*) configured to generate and/or manage a device identifier associated with the control mesh node 108. The device ID component 207*b* includes identical or nearly identical functionality as device ID component 207*a* in FIG. 2A, but with respect to devices and/or components of the control mesh node 108 instead of devices and/or components of the mesh node 104.

The control mesh node 108 includes a bus (not shown), such as an address/data bus or other communication mechanism for communicating information, which interconnects the devices and/or components of the control mesh node 108, such as processing device 202*b*, network interface 206*b*, input/output device 205*b*, and/or device ID component 207*b*.

In some embodiments, some or all the devices and/or components of control mesh node 108 may be implemented with the processing device 202*b*. For example, the control mesh node 108 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

FIG. 2C is a block diagram depicting an example environment of a mesh network system, according to some embodiments. The environment 200*c* includes a mesh network system 202*c* (e.g., mesh network system 102 in FIG. 1) of mesh nodes 284*c* (e.g., mesh nodes 104 in FIG. 1). The mesh network system 202*c* includes a control node 208*c* (e.g., control mesh node 108 in FIG. 1), a joiner node 204*c* (e.g., mesh node 104*a* in FIG. 1), and objects coupled to the joiner node 204*c*.

A control node 208*c* of a mesh network system 202*c* of nodes 284*c* (e.g., mesh nodes 104 in FIG. 1) receives a request 234*c* from a joiner node 204*c* to join the mesh network system 202*c*. The joiner node 204*c* is configured to provide a service 242*c* to one or more objects 203*c* that are communicatively coupled to the joiner node 204*c*. The control node 208*c* is configured to generate a set of non-deterministic finite-state machine (NFSM) models 237*c* based on the service 242*c*. Each NFSM model 237*c* is configured to provide a unique version 245c of the service 242*c* by determining a state 254*c* of the one or more objects 203*c* based on sensor data 267*c* and object status data 265*c* indicative of a user interaction 222*c* with the one or more objects 203*c*. The control node is configured to provide the set of NFSM models 237*c* to the joiner node to cause the joiner node 204*c* to select a single NFSM model 243*c* of the set of NFSM models 237*c* and use the single NFSM model 243*c* to provide the unique version 245c of the service 242*c* to the one or more objects 203*c*.

FIG. 3 is a flow diagram depicting a method of providing additional context and decision-making capabilities in mesh network systems using IoT technology, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a control mesh node, such as control mesh node 108 in FIG. 1. In some embodiments, method 300 may be performed by one or more mesh nodes, such as mesh nodes 104 in FIG. 1. In some embodiments, method 300 may be performed by a mesh network system, such as mesh network system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 4, the method 300 includes the block 302 of receiving a request from a joiner node to join a mesh network of nodes, the joiner node to provide a service to one or more objects. The method 300 includes the block 304 of generating, by a processing device, a set of non-deterministic finite-state machine (NFSM) models based on the service, each NFSM model configured to provide a unique version of the service by determining a state of the one or more objects based on sensor data and object status data indicative of a user interaction with the one or more objects. The method 300 includes the block 306 of providing the set of NFSM models to the joiner node to cause the joiner node to select a single NFSM model of the set of NFSM models and use the single NFSM model to provide the unique version of the service to the one or more objects.

FIG. 4 is a flow diagram depicting a method of providing additional context and decision-making capabilities in mesh network systems using IoT technology, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by a control mesh node, such as control mesh node 108 in FIG. 1. In some embodiments, method 400 may be performed by one or more mesh nodes, such as mesh nodes 104 in FIG. 1. In some embodiments, method 400 may be performed by a mesh network system, such as mesh network system 102 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of sending, by a joiner node, a request to join a mesh network system of nodes, the joiner node to provide a service to one or more objects. The method 400 includes the block 404 of receiving a set of non-deterministic finite-state machine (NFSM) models associated with a service, each NFSM model configured to provide a unique version of the service by determining a state of the one or more objects based on sensor data and object status data indicative of a user interaction with the one or more objects. The method 400 includes the block 406 of selecting a single NFSM model of the set of NFSM models. The method 400 includes the block 408 of providing, to the single NFSM model, the sensor data and the object status data to provide the unique version of the service to the one or more objects.

Figure 5:
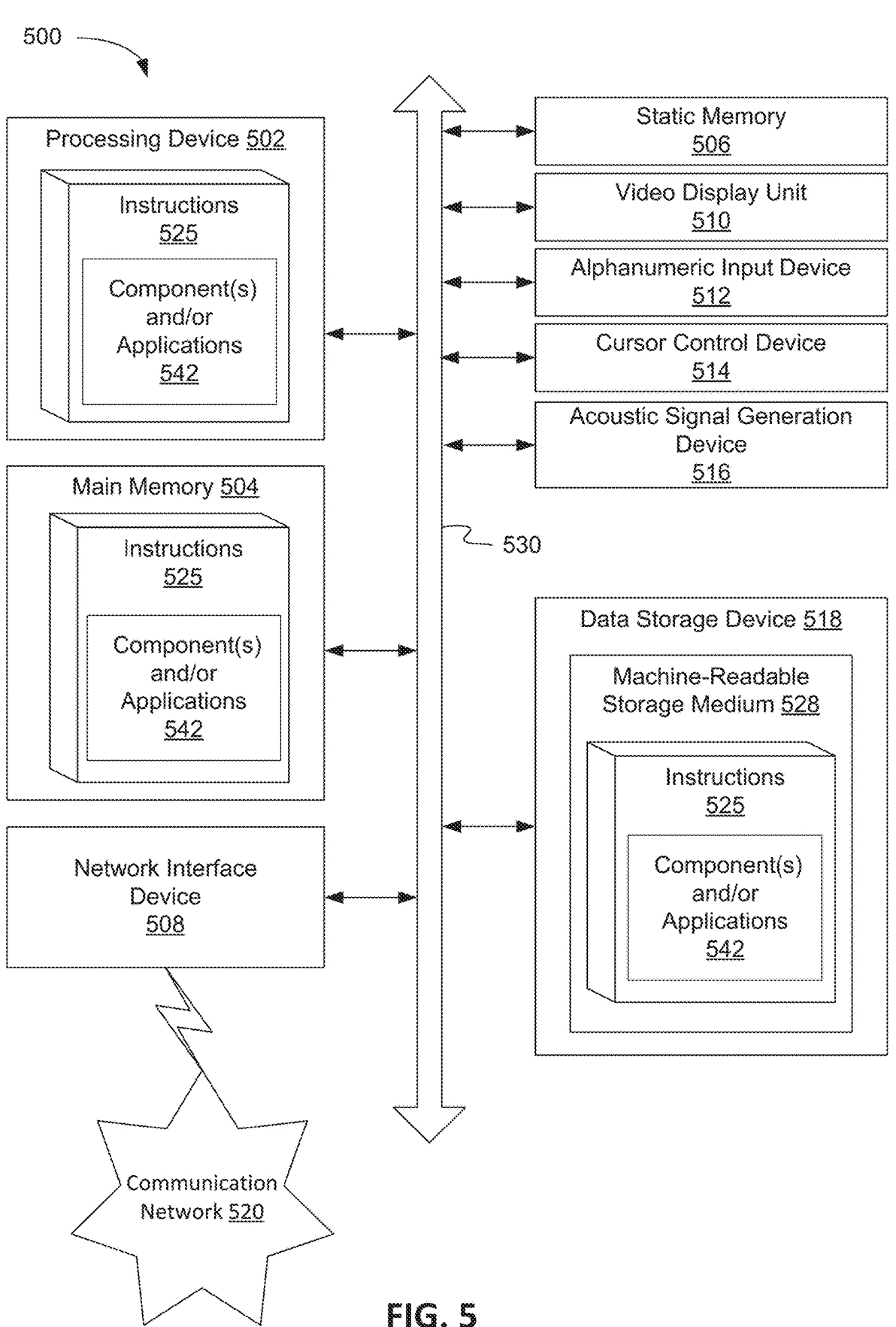
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components, agents, and/or applications 542 (e.g., SMM agent 105 in FIG. 1, ASM agent 109 in FIG. 1) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method including receiving a request from a joiner node to join a mesh network system of nodes, the joiner node to provide a service to one or more objects; generating, by a processing device, a set of non-deterministic finite-state machine (NFSM) models based on the service, each NFSM model configured to provide a unique version of the service by determining a state of the one or more objects based on sensor data and object status data indicative of a user interaction with the one or more objects; and providing the set of NFSM models to the joiner node to cause the joiner node to select a single NFSM model of the set of NFSM models and use the single NFSM model to provide the unique version of the service to the one or more objects.

Example 2 is the method of Example 1, wherein determining the state of the one or more objects includes determining, based on the object status data, that a user forced the one or more objects into the state.

Example 3 is the method of any of Examples 1-2, wherein determining the state of the one or more objects includes identifying a second state for the one or more objects based on the sensor data; and allowing the one or more objects to be in the state responsive to identifying the second state for the one or more objects.

Example 4 is the method of any of Examples 1-3, wherein determining the state of the one or more objects further includes determining that the one or more objects are configured in an intermediate state; identifying the state of the one or more objects based on the sensor data; and reconfiguring the one or more objects from the intermediate state into the state.

Example 5 is the method of any of Examples 1-4, wherein the user caused the one or more objects to enter the state by at least one of moving the one or more objects, toggling a switch associated with the one or more objects, or pushing a button associated with the one or more objects.

Example 6 is the method of any of Examples 1-5, further including gathering the sensor data from one or more sensors coupled to the processing device, wherein the sensor data is indicative of an environment associated with the processing device.

Example 7 is the method of any of Examples 1-6, wherein determining the state of the one or more objects further includes determining that the single NFSM model generates an undesired output based on at least one of the sensor data or the object status data; and causing the joiner node to select a second NFSM model of the set of NFSM models and use the second NFSM model to provide a second unique version of the service to the one or more objects.

Example 8 is the method of any of Examples 1-7, wherein determining the state of the one or more objects includes generating a description associated with the one or more objects; and presenting the description to the user.

Example 9 is the method of any of Examples 1-8, wherein the description includes at least one or more of an indication that the user forced the one or more objects into the state, an indication that one or more alarms caused one or more objects to enter the state, or an indication that one or more sensors caused the one or more objects to enter the state.

Example 10 is the method of any of Examples 1-9, wherein determining the state of the one or more objects includes determining a conflict between a first state selected by the user and a second state selected by the single NFSM model; selecting, based on the service, the second state selected by the single NFSM model instead of the first state selected by the user; and configuring the one or more objects into the second state.

Example 11 is a system including a plurality of computing devices, wherein each computing device corresponds to a respective node of a plurality of nodes of the mesh network system, each computing device includes a processing device, wherein the processing device of a control node of the plurality of nodes to receive a request from a joiner node to join the mesh network system, the joiner node to provide a service to one or more objects; generate a set of non-deterministic finite-state machine (NFSM) models based on the service, each NFSM model configured to provide a unique version of the service by determining a state of the one or more objects based on sensor data and object status data indicative of a user interaction with the one or more objects; and provide the set of NFSM models to the joiner node to cause the joiner node to select a single NFSM model of the set of NFSM models and use the single NFSM model to provide the unique version of the service to the one or more objects.

Example 12 is the system of Example 11, wherein to determine the state of the one or more objects, the processing device of the control node is further to determine, based on the object status data, that a user forced the one or more objects into the state.

Example 13 is the system of any of Examples 11-12, wherein to determine the state of the one or more objects, the processing device of the control node is further to identify a second state for the one or more objects based on the sensor data; and allow the one or more objects to be in the state responsive to identifying the second state for the one or more objects.

Example 14 is the system of any of Examples 11-13, wherein to determine the state of the one or more objects, the processing device of the control node is further to determine that the one or more objects are configured in an intermediate state; identify the state of the one or more objects based on the sensor data; and reconfigure the one or more objects from the intermediate state into the state.

Example 15 is the system of any of Examples 11-14, wherein the processing device of the control node is further to gather the sensor data from one or more sensors coupled to the processing device, wherein the sensor data is indicative of an environment associated with the processing device.

Example 16 is the system of any of Examples 11-15, wherein to determine the state of the one or more objects, the processing device of the control node is further to determine that the single NFSM model generates an undesired output based on at least one of the sensor data or the object status data; and cause the joiner node to select a second NFSM model of the set of NFSM models and use the second NFSM model to provide a second unique version of the service to the one or more objects.

Example 17 is the system of any of Examples 11-16, wherein to determine the state of the one or more objects, the processing device of the control node is further to generate a description associated with the one or more objects; and presenting the description to the user.

Example 18 is the system of any of Examples 11-17, wherein the description includes at least one or more of an indication that the user forced the one or more objects into the state, an indication that one or more alarms caused one or more objects to enter the state, or an indication that one or more sensors caused the one or more objects to enter the state.

Example 19 is the system of any of Examples 11-18, wherein to determine the state of the one or more objects, the processing device of the control node is further to determine a conflict between a first state selected by the user and a second state selected by the single NFSM model; select, based on the service, the second state selected by the single NFSM model instead of the first state selected by the user; and configure the one or more objects into the second state.

Example 20 is a non-transitory computer-readable medium storing instructions that, when execute by a processing device of a control node of a mesh network system, cause the processing device to receive a request from a joiner node to join the mesh network system, the joiner node to provide a service to one or more objects; generate, by the processing device, a set of non-deterministic finite-state machine (NFSM) models based on the service, each NFSM model configured to provide a unique version of the service by determining a state of the one or more objects based on sensor data and object status data indicative of a user interaction with the one or more objects; and provide the set of NFSM models to the joiner node to cause the joiner node to select a single NFSM model of the set of NFSM models and use the single NFSM model to provide the unique version of the service to the one or more objects.

Example 21 is an apparatus including means for receiving a request from a joiner node to join a mesh network system of nodes, the joiner node to provide a service to one or more objects; generating, by a processing device, a set of non-deterministic finite-state machine (NFSM) models based on the service, each NFSM model configured to provide a unique version of the service by determining a state of the one or more objects based on sensor data and object status data indicative of a user interaction with the one or more objects; and providing the set of NFSM models to the joiner node to cause the joiner node to select a single NFSM model of the set of NFSM models and use the single NFSM model to provide the unique version of the service to the one or more objects.

Example 22 is the apparatus of Example 21, wherein determining the state of the one or more objects includes determining, based on the object status data, that a user forced the one or more objects into the state.

Example 23 is the apparatus of any of Examples 21-22, wherein determining the state of the one or more objects includes identifying a second state for the one or more objects based on the sensor data; and allowing the one or more objects to be in the state responsive to identifying the second state for the one or more objects.

Example 24 is the apparatus of any of Examples 21-23, wherein determining the state of the one or more objects further includes determining that the one or more objects are configured in an intermediate state; identifying the state of the one or more objects based on the sensor data; and reconfiguring the one or more objects from the intermediate state into the state.

Example 25 is the apparatus of any of Examples 21-24, wherein the user caused the one or more objects to enter the state by at least one of moving the one or more objects, toggling a switch associated with the one or more objects, or pushing a button associated with the one or more objects.

Example 26 is the apparatus of any of Examples 21-25, further including gathering the sensor data from one or more sensors coupled to the processing device, wherein the sensor data is indicative of an environment associated with the processing device.

Example 27 is the apparatus of any of Examples 21-26, wherein determining the state of the one or more objects further includes determining that the single NFSM model generates an undesired output based on at least one of the sensor data or the object status data; and causing the joiner node to select a second NFSM model of the set of NFSM models and use the second NFSM model to provide a second unique version of the service to the one or more objects.

Example 28 is the apparatus of any of Examples 21-27, wherein determining the state of the one or more objects includes generating a description associated with the one or more objects; and presenting the description to the user.

Example 29 is the apparatus of any of Examples 21-28, wherein the description includes at least one or more of an indication that the user forced the one or more objects into the state, an indication that one or more alarms caused one or more objects to enter the state, or an indication that one or more sensors caused the one or more objects to enter the state.

Example 30 is the apparatus of any of Examples 21-29, wherein determining the state of the one or more objects includes determining a conflict between a first state selected by the user and a second state selected by the single NFSM model; selecting, based on the service, the second state selected by the single NFSM model instead of the first state selected by the user; and configuring the one or more objects into the second state.

Example 31 is a method including sending, by a joiner node, a request to join a mesh network system of nodes, the joiner node to provide a service to one or more objects; receiving a set of non-deterministic finite-state machine (NFSM) models associated with a service, each NFSM model configured to provide a unique version of the service by determining a state of the one or more objects based on sensor data and object status data indicative of a user interaction with the one or more objects; selecting a single NFSM model of the set of NFSM models; and providing, to the single NFSM model, the sensor data and the object status data to provide the unique version of the service to the one or more objects.

Unless specifically stated otherwise, terms such as "receiving," "generating," "providing," "sending," "selecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:
receiving a request from a joiner node to join a mesh network system of nodes, the joiner node to provide a service to one or more objects;
generating, by a processing device, a set of non-deterministic finite-state machine (NFSM) models based on the service, each NFSM model configured to provide a unique version of the service by determining a state of the one or more objects based on sensor data and object status data indicative of a user interaction with the one or more objects, wherein determining the state of the one or more objects further comprises determining, based on the object status data, that a user forced the one or more objects into the state and determining, based on the object status data, that the one or more objects did not respond as expected to being forced into the state; and
providing the set of NFSM models to the joiner node to cause the joiner node to select a single NFSM model of the set of NFSM models based on the sensor data and the object status data associated with the one or more objects and use the single NFSM model to provide the unique version of the service to the one or more objects.

2. The method of claim 1, wherein determining the state of the one or more objects comprises:
identifying a second state for the one or more objects based on the sensor data; and
allowing the one or more objects to be in the state responsive to identifying the second state for the one or more objects.

3. The method of claim 1, wherein determining the state of the one or more objects further comprises:
determining that the one or more objects are configured in an intermediate state;
identifying the state of the one or more objects based on the sensor data; and
reconfiguring the one or more objects from the intermediate state into the state.

4. The method of claim 1, wherein the user caused the one or more objects to enter the state by at least one of:

moving the one or more objects,
toggling a switch associated with the one or more objects, or
pushing a button associated with the one or more objects.

5. The method of claim 1, further comprising:
gathering the sensor data from one or more sensors coupled to the processing device, wherein the sensor data is indicative of an environment associated with the processing device.

6. The method of claim 1, wherein determining the state of the one or more objects further comprises:
determining that the single NFSM model generates an undesired output based on at least one of the sensor data or the object status data; and
causing the joiner node to select a second NFSM model of the set of NFSM models and use the second NFSM model to provide a second unique version of the service to the one or more objects.

7. The method of claim 1, wherein determining the state of the one or more objects comprises:
generating a description associated with the one or more objects; and
presenting the description to the user.

8. The method of claim 7, wherein the description comprises at least one or more of:
an indication that the user forced the one or more objects into the state,
an indication that one or more alarms caused one or more objects to enter the state, or
an indication that one or more sensors caused the one or more objects to enter the state.

9. The method of claim 1, wherein determining the state of the one or more objects comprises:
determining a conflict between a first state selected by the user and a second state selected by the single NFSM model;
selecting, based on the service, the second state selected by the single NFSM model instead of the first state selected by the user; and
configuring the one or more objects into the second state.

10. A mesh network system, comprising:
a plurality of computing devices, wherein each computing device corresponds to a respective node of a plurality of nodes of the mesh network system, each computing device comprises a processing device,
wherein the processing device of a control node of the plurality of nodes to:
receive a request from a joiner node to join the mesh network system, the joiner node to provide a service to one or more objects;
generate a set of non-deterministic finite-state machine (NFSM) models based on the service, each NFSM model configured to provide a unique version of the service by determining a state of the one or more objects based on sensor data and object status data indicative of a user interaction with the one or more objects, wherein to determine the state of the one or more objects the processing device is further to determine, based on the object status data, that a user forced the one or more objects into the state, and determine, based on the object status data, that the one or more objects did not respond as expected to being forced into the state; and
provide the set of NFSM models to the joiner node to cause the joiner node to select a single NFSM model of the set of NFSM models based on the sensor data and the object status data associated with the one or more objects and use the single NFSM model to provide the unique version of the service to the one or more objects.

11. The mesh network system of claim 10, wherein to determine the state of the one or more objects, the processing device of the control node is further to:

identify a second state for the one or more objects based on the sensor data; and allow the one or more objects to be in the state responsive to identifying the second state for the one or more objects.

12. The mesh network system of claim 10, wherein to determine the state of the one or more objects, the processing device of the control node is further to:

determine that the one or more objects are configured in an intermediate state;

identify the state of the one or more objects based on the sensor data; and reconfigure the one or more objects from the intermediate state into the state.

13. The mesh network system of claim 10, wherein the processing device of the control node is further to:

gather the sensor data from one or more sensors coupled to the processing device, wherein the sensor data is indicative of an environment associated with the processing device.

14. The mesh network system of claim 10, wherein to determine the state of the one or more objects, the processing device of the control node is further to:

determine that the single NFSM model generates an undesired output based on at least one of the sensor data or the object status data; and cause the joiner node to select a second NFSM model of the set of NFSM models and use the second NFSM model to provide a second unique version of the service to the one or more objects.

15. The mesh network system of claim 10, wherein to determine the state of the one or more objects, the processing device of the control node is further to:

generate a description associated with the one or more objects; and presenting the description to the user.

16. The mesh network system of claim 15, wherein the description comprises at least one or more of:

an indication that the user forced the one or more objects into the state, an indication that one or more alarms caused one or more objects to enter the state, or an indication that one or more sensors caused the one or more objects to enter the state.

17. The mesh network system of claim 10, wherein to determine the state of the one or more objects, the processing device of the control node is further to:

determine a conflict between a first state selected by the user and a second state selected by the single NFSM model;

select, based on the service, the second state selected by the single NFSM model instead of the first state selected by the user; and configure the one or more objects into the second state.

18. A non-transitory computer-readable medium storing instructions that, when execute by a processing device of a control node of a mesh network system, cause the processing device to:

receive a request from a joiner node to join the mesh network system, the joiner node to provide a service to one or more objects;

generate, by the processing device, a set of non-deterministic finite-state machine (NFSM) models based on the service, each NFSM model configured to provide a unique version of the service by determining a state of the one or more objects based on sensor data and object status data indicative of a user interaction with the one or more objects, wherein to determine the state of the one or more objects the processing device is further to determine, based on the object status data, that a user forced the one or more objects into the state, and determine, based on the object status data, that the one or more objects did not respond as expected to being forced into the state; and provide the set of NFSM models to the joiner node to cause the joiner node to select a single NFSM model of the set of NFSM models based on the sensor data and the object status data associated with the one or more objects and use the single NFSM model to provide the unique version of the service to the one or more objects.

* * * * *